(12) United States Patent
Xuan

(10) Patent No.: US 6,207,926 B1
(45) Date of Patent: Mar. 27, 2001

(54) FIBER OPTIC LASER TEXTURING WITH OPTICAL PROBE FEEDBACK CONTROL

(75) Inventor: Jialuo Jack Xuan, Milpitas, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/955,448

(22) Filed: Oct. 21, 1997

Related U.S. Application Data

(63) Continuation-in-part of application No. 08/954,585, filed on Oct. 20, 1997, now Pat. No. 5,952,058.
(60) Provisional application No. 60/037,627, filed on Jan. 15, 1997.

(51) Int. Cl.[7] .................................................. B23K 26/36
(52) U.S. Cl. ................................ 219/121.68; 219/121.69; 219/121.77; 219/121.83; 427/555
(58) Field of Search .......................... 219/121.68, 121.69, 219/121.83, 121.77; 264/400; 427/555

(56) References Cited

U.S. PATENT DOCUMENTS

| | | |
|---|---|---|
| 3,674,340 | 7/1972 | Jacob . |
| 3,764,218 | 10/1973 | Schedewie ........................ 356/365 |
| 3,938,878 | 2/1976 | Fox ...................................... 359/251 |
| 4,060,306 | 11/1977 | Swaminathan . |
| 4,139,263 | 2/1979 | Lehureau et al. . |
| 4,398,790 * | 8/1983 | Righini et al. . |
| 5,062,021 | 10/1991 | Ranjan et al. ....................... 360/135 |
| 5,128,914 | 7/1992 | Kurata et al. . |
| 5,155,329 * | 10/1992 | Terada et al. .................... 219/121.64 |
| 5,166,006 | 11/1992 | Lal et al. . |
| 5,202,810 | 4/1993 | Nakamura et al. . |
| 5,273,834 | 12/1993 | Hoover et al. . |
| 5,283,416 * | 2/1994 | Shirk .............................. 219/121.64 |
| 5,391,522 | 2/1995 | Goto et al. . |
| 5,402,407 | 3/1995 | Eguchi et al. . |
| 5,416,755 | 5/1995 | Endo et al. . |
| 5,468,932 * | 11/1995 | Jacob .............................. 219/121.69 |
| 5,550,696 | 8/1996 | Nguyen ................................ 360/135 |
| 5,586,040 * | 12/1996 | Baumgart et al. . |
| 5,595,791 | 1/1997 | Baumgart et al. .................... 427/554 |
| 5,630,953 * | 5/1997 | Klink ............................... 219/121.69 |
| 5,699,160 * | 12/1997 | Barenboim et al. ................. 356/359 |
| 5,877,858 * | 3/1999 | Kerstens et al. ..................... 356/359 |

FOREIGN PATENT DOCUMENTS

| | | |
|---|---|---|
| 3930573 * | 9/1989 | (DE) . |
| 0652554 A1 | 5/1995 | (EP) . |

OTHER PUBLICATIONS

"Delivering Nd:YAG Laser Beams The Easy Way" by Cunningham, pp. 59,60,62,64 of Sep. 1990 *Lasers & Optronics* Sep. 1990.*

Kuo et al., "Laser Zone Texturing on Glass and Glass–Ceramic Substrates," presented at The Magnetic Recording Conference (TMRC), Santa Clara, California, Aug. 19–21, 1996.

Baumgart et al. "A New Laser Texturing Technique for High Performance Magnetic Disk Drives," IEEE Transactions on Magnetics, vol. 31, No. 6, pp. 2946–2951, Nov. 1995.

* cited by examiner

*Primary Examiner*—Geoffrey S. Evans
(74) *Attorney, Agent, or Firm*—McDermott, Will & Emery

(57) ABSTRACT

The substrate of a magnetic recording medium is laser textured with uniformity and precision employing a fiber optic laser delivery system with a microfocusing lens. Surface variations, such as surface runout, are detected with an optical probe and a laser texturing parameter adjusted via a feedback control system in response to a detected surface variation. Embodiments include adjusting the pulse power, pulse duration, repetition rate and/or distance between the microfocusing lens and substrate surface in response to a detected surface variation.

30 Claims, 2 Drawing Sheets

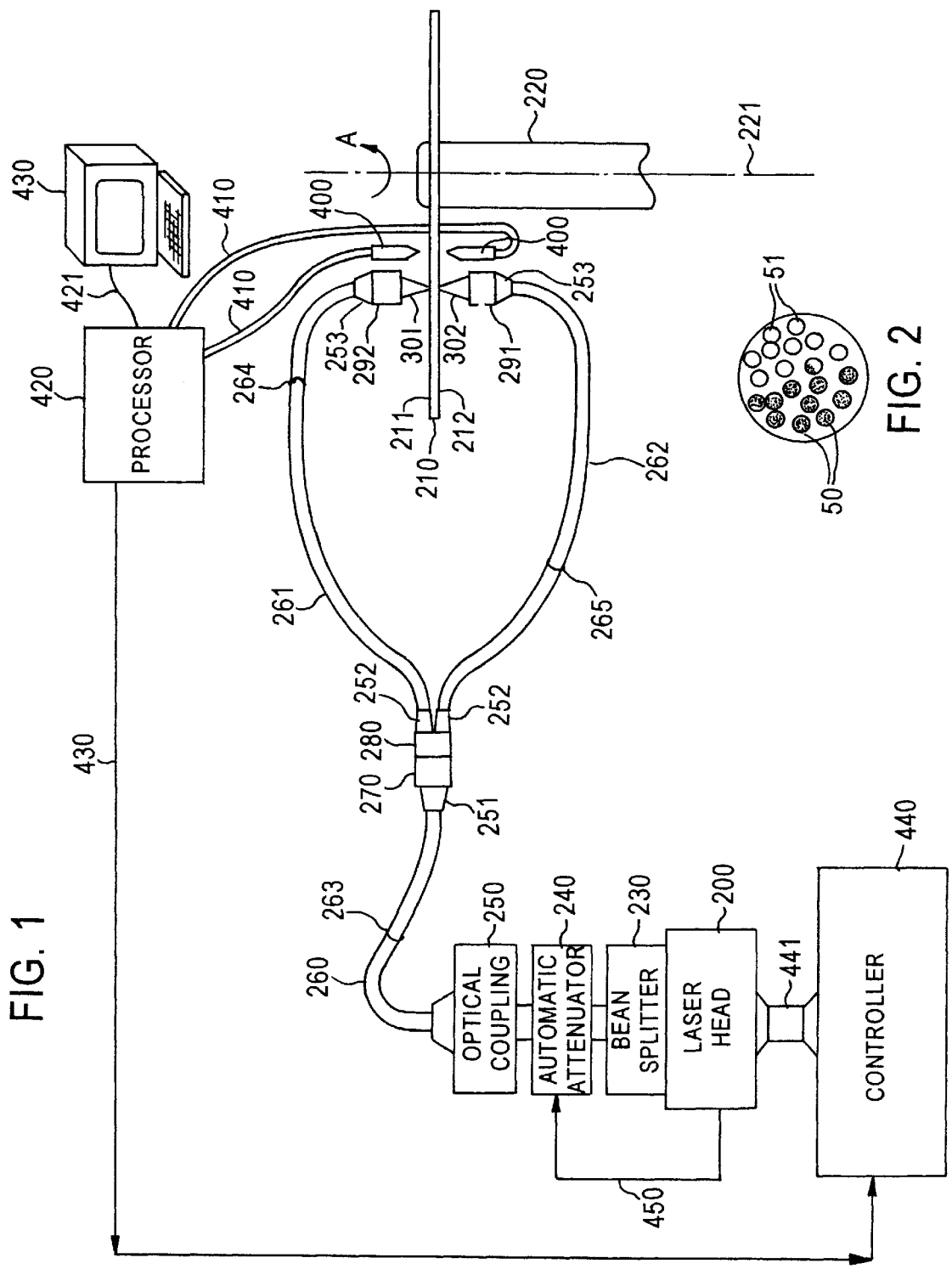

FIBER OPTIC LASER TEXTURING WITH OPTICAL PROBE FEEDBACK CONTROL

RELATED APPLICATIONS

This application claims priority from provisional patent application Ser. No. 60/037,627, filed Jan. 15, 1997, the entire disclosure of which is hereby incorporated by reference herein.

This application is a continuation-in-part application of U.S. patent application Ser. No. 08/954,585, filed on Oct. 20, 1997 now U.S. Pat. No. 5,952,058 the entire disclosure of which is hereby incorporated by reference herein.

Some of the subject matter disclosed in this application is similar to subject matter disclosed in copending application Ser. No. 08/919,601 filed on Aug. 28, 1997 (now Pat. No. 5,837,330).

TECHNICAL FIELD

The present invention relates generally to laser texturing a magnetic recording medium. The present invention is particularly applicable to laser texturing a substrate for a high areal recording density magnetic recording medium.

BACKGROUND ART

Conventional magnetic disk drive designs comprise a commonly denominated Contact Start-Stop (CSS) system commencing when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

The escalating requirements for high areal recording density impose increasingly greater requirements on thin film magnetic media in terms of coercivity, restriction, squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head challenges the limitations of conventional technology for controlled texturing to avoid head crash.

Conventional techniques for providing a disk substrate with a textured surface comprise a mechanical operation, such as polishing. In texturing a substrate for a magnetic recording medium, conventional practices comprise mechanically polishing the surface to provide a data zone having a substantially smooth surface and a landing zone characterized by topographical features, such as protrusions and depressions. See, for example, Nakamura et al., U.S. Pat. No. 5,202,810. Conventional mechanical texturing techniques, however, are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. Such relatively crude mechanical polishing with attendant scratches and debris makes it difficult to obtain adequate data zone substrate polishing for proper crystallographic orientation of a subsequently deposited magnetic layer. In addition, various desirable substrates are difficult to process by mechanical texturing. This undesirably limiting facet of mechanical texturing, virtually excludes the use of many materials for use as substrates.

An alternative technique to mechanical texturing for texturing a landing zone comprises the use of a laser light beam focused on an upper surface of a non-magnetic substrate. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. See, also, U.S. Pat. Nos. 5,550,696 and 5,595,791.

In copending application Ser. No. 08/666,374 filed on Jun. 27, 1996 a laser texturing technique is disclosed employing a multiple lens focusing system for improved control of the resulting topographical texture. In copending application Ser. No. 08/647,407 filed on May 9, 1996, a laser texturing technique is disclosed wherein a pulsed, focused laser light beam is passed through a crystal material to control the spacing between resulting protrusions.

In copending PCT application Ser. No. PCT/US96/06830, a method is disclosed for laser texturing a glass or glass-ceramic substrate employing a laser light beam derived from a $CO_2$ laser source. The textured glass or glass-ceramic substrate surface comprises a plurality of protrusions which extend above the substrate surface, without surrounding valleys extending substantially into the substrate as is characteristic of a laser textured metallic substrate. The effect of laser parameters, such as pulse width, spot size and pulse energy, and substrate composition on the protrusion or bump height of a laser textured glass or glass-ceramic substrate is reported by Kuo et al., in an article entitle "Laser Zone Texturing on Glass and Glass-Ceramic Substrates," presented at The Magnetic Recording Conference (TMRC), Santa Clara, Calif., Aug. 19–21, 1996.

In copending application Ser. No. 08/796,830 filed on Feb. 7, 1997, a method is disclosed for laser texturing a glass or glass-ceramic substrate, wherein the height of the protrusions is controlled by controlling the quench rate during resolidification of the laser formed protrusions. One of the disclosed techniques for controlling the quench rate comprises preheating a substrate, as by exposure to a first laser light beam, and then exposing the heated substrate to a focused laser light beam.

As areal recording density increases the flying height must be reduced accordingly, thereby challenging the limitations of conventional laser texturing technology for uniformity and precision in forming a textured landing zone comprising a plurality of protrusions. The requirements for continuous alignment and adjustment of a laser beam are exacerbated in geographic locations with relatively unstable environmental conditions, such as temperature, vibration and shock, particularly in regions susceptible to seismological disturbances such as tremors and earthquakes. Conventional laser delivery systems for texturing a landing zone comprise a system of mirrors and lenses which must be precisely and accurately maintained, particularly as the flying height is reduced to a level of less than about 300 Å, due to inherent undulations of the substrate surface. Uniform and precise texturing require continuous maintenance of alignment of a system of mirrors and lenses. It is extremely difficult to maintain the requisite precise alignment and satisfy the reduced flying height requirements for high areal recording density, particularly in geographical locations subjected to environmental changes, and seismological disturbances.

In parent copending application Ser. No. 08/954,585, filed on Oct. 20, 1997, now U.S. Pat. No. 5,952,058, an apparatus and method are disclosed for laser texturing a substrate employing a fiber-optic laser delivery system wherein sub-laser beams are passed through plural fiber optic cables and microfocusing lens to impinge on opposite surfaces of a rotating substrate. The use of a fiber optic cable delivery system facilitates alignment and reduces maintenance, even in geographical areas subject to environmental changes, particularly seismological disturbances.

There are, however, inherent variations in the surface topography of a disk substrate, e.g., variations in surface planarity such as undulations, adhering particles and surface runout, which render it difficult to maintain a microfocusing lens in focus with uniform precision, since the microfocusing lens must be placed in extremely close proximity to a substrate surface, e.g. less than about 2mm. As the flying height is reduced below about 300 Å, such surface variations become acutely problematic.

Accordingly, there exists a need for a laser texturing system which facilitates alignment and adjustment of a laser beam, requires minimum maintenance, and is capable of uniform precision notwithstanding substrate surface variations, particularly for high areal recording density magnetic recording media.

DISCLOSURE OF THE INVENTION

An object of the present invention is a method and apparatus for texturing a substrate for a magnetic recording medium with uniform precision and minimum maintenance.

Another object of the present invention is a method and apparatus for laser texturing a landing zone on a substrate for a high areal recording density magnetic recording medium with uniform protrusions.

Additional objects, advantages and other features of the invention will be set forth in each description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by an apparatus for laser texturing a substrate for a magnetic recording medium, which apparatus comprises: a source for emitting a laser light beam; a spindle for rotating the substrate during laser texturing; a first microfocusing lens positioned proximate a first surface of the substrate through which a first laser light sub-beam is impinged on the first surface; a first fiber optic cable having a first end optically linked to the laser light beam source and a second end optically linked to the first microfocusing lens; and a first optical probe positioned proximate the first surface for detecting a variation in the planarity of the first surface.

Another aspect of the present invention is a method of manufacturing a magnetic recording medium, which method comprises: passing a first laser light sub-beam through a first fiber optic cable and then through a first microfocusing lens to impinge on a first surface of a rotating substrate to texture the first surface of the substrate; and detecting a variation in the planarity of the first surface during texturing.

Additional objects and advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 1 schematically illustrates a fiber optic laser delivery apparatus in accordance with an embodiment of the present invention.

FIG. 2 is a cross-sectional view of a fiber optic probe employed in an embodiment of the present invention.

BEST MODE FOR CARRYING OUT THE INVENTION

Figure 3:
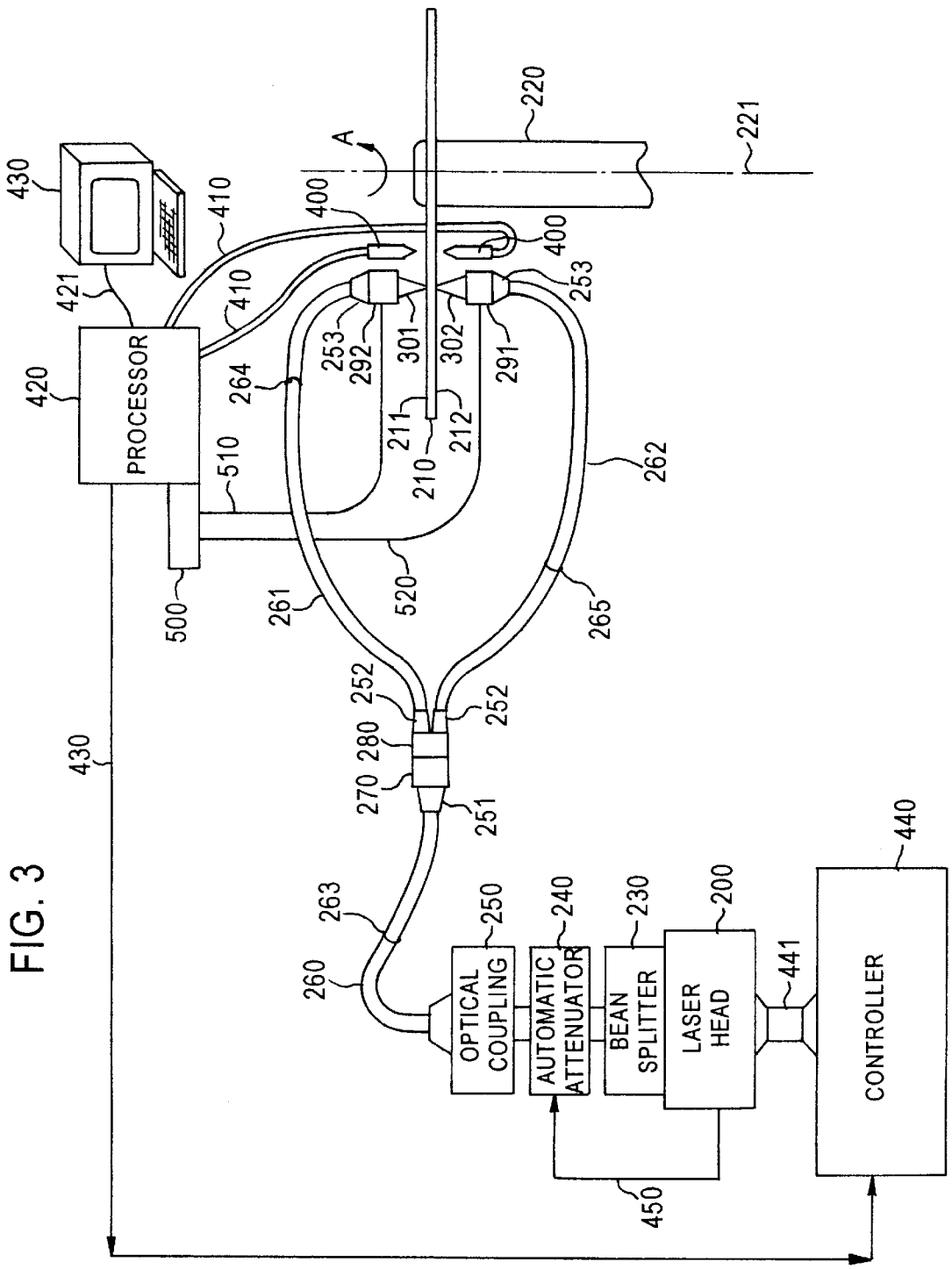
FIG. 3 schematically illustrates a fiber optic laser delivery apparatus in accordance with another embodiment of the present invention.

The present invention constitutes an improvement on the apparatus and methodology disclosed in copending application Ser. No. 08/954,585 filed on Oct. 20, 1997, now U.S. Pat. No. 5,952,058 which addresses and solves the problem of maintaining precise alignment of a laser delivery system during substrate texturing. The use of fiber optic cables and microfocusing lenses enables the formation of a textured surface on a substrate for a magnetic recording medium with high precision and minimal alignment maintenance, particularly in geographic locations subject to environmental changes, such as seismological disturbances. However, as areal recording density increases with an attendant demand for further reduced flying heights, it becomes increasingly difficult to produce a texture on a substrate surface with uniform precision, e.g., maintain a microfocusing lens at a constant minimal distance of about 500 $\mu$m to about 1,500 $\mu$m, with a minimum depth of focus of about 3 $\mu$m to about 10 $\mu$m from the substrate surface undergoing laser texturing, because of inherent surface variations, particularly variations in the planarity of the substrate surface, such as undulations or runout. Accordingly, as the flying height is reduced to a distance below about 300 Å, it is extremely difficult to provide a laser texture comprising a plurality of protrusions with uniform precision for a landing zone. The present invention addresses and solves that problem by enabling control of a laser light beam and/or positioning of a microfocusing lens in response to a detected surface variation, to maintain uniform precision in laser texturing.

In accordance with an embodiment of the present invention, a probe, such as an optical probe, e.g. fiber optic probe, is provided in proximity to the surface of a disk substrate during laser texturing by passing a laser light beam through a microfocusing lens. The fiber optic probe detects surface variations, including subtle variations in planarity, e.g., inherent surface waviness or runout. Light signals indicative of any such surface variations are fed back to an optical feedback data processing and control system wherein the light signals are converted into electrical signals in an associated interface module housed therein, the data analyzed and a laser parameter and/or the distance between a microfocusing lens and the substrate surface adjusted. The optical feedback data processing and control system contains an associated computer and a laser controller linked to a laser head. The laser optic system comprises an automatic attenuator for appropriate adjustment of the power of the laser light beam in response to sensed surface variations to ensure that laser texturing results in uniform protrusions. The distance between each microfocusing lens and the substrate can also be adjusted in response to sensed surface variations, in lieu of or in addition to adjusting a laser parameter, to insure uniform texturing.

Thus, in accordance with the present invention, the apparatus and methodology disclosed in copending application Ser. No. 08/954,585, filed on Oct. 20, 1997, now U.S. Pat. No. 5,952,058 are modified to provide optical probes and a feedback control system for adjusting the laser light beam and/or distance between each microfocusing lens and the substrate surface in response to detected surface variations. The present invention, therefore, comprises a fiber optic cable having one end linked to a laser light beam source and the other end thereof optically linked to a microfocusing lens positioned at an optimum distance from a surface of a substrate and a laser light beam impinged thereon during substrate rotation.

In an embodiment of the present invention, the laser light beam source comprises a conventional carbon dioxide ($CO_2$), yttrium-aluminum garnet (YAG), yttrium-lithiumfluoride (YLF) or yttrium-vanadium oxide ($YVO_4$) laser light beam source, coupled to an electric shuttle which, in turn, is linked to an automatic attenuator to which one end of the fiber optic cable is optically linked while the other end is optically linked to a beam splitter. Two additional fiber optic cables are optically linked to the beam splitter at one end and optically linked to a microfocusing lens at the other end. The microfocusing lenses have substantially the same depth of focus, e.g., about 3 $\mu$m to about 10 $\mu$m, and are positioned at substantially the same optimal distance from opposite surfaces of the substrate for laser texturing. Fiber optic cables, by their nature, can be positioned and maintained in alignment with significantly reduced maintenance vis-à-vis the complex system of mirrors and lenses required for maintaining the requisite alignment precision of conventional laser systems employed for texturing a substrate for a magnetic recording medium.

Embodiments of the present invention include positioning microfocusing lenses at a distance of about 500 $\mu$m to about 1,500 $\mu$m from opposite surfaces of a substrate on a rotating spindle. Optical probes, such as fiber optic probes, are positioned proximate opposite surfaces of the substrate during laser texturing to detect surface variations, such as surface planarity variations stemming from inherent waviness or surface runout. The fiber optic probes are linked to an optical feedback data processing and control system comprising a fiber optic probe-interface module, a processor with associated conventional peripheral equipment and laser controller for adjusting a relevant laser parameter in response to a detected surface variation. The optical feedback data processing and control system can also comprise a mechanism controller linked to the microfocusing lenses for adjusting the distance between each microfocusing lens and opposite substrate surfaces and, hence, the focus of each microfocusing lens to maintain uniform precision during texturing.

The optical feedback data processing and control system of the present invention typically comprises a laser controller which is linked to the laser head which, in turn, is linked to the automatic attenuator for adjusting the laser power in response to a detected surface variation for uniform texturing. For example, upon detecting an elevation, the laser power can be reduced or discontinued in response thereto. The pulse duration and repetition rate can also be adjusted in response to a detected surface variation in combination with the power and/or distances of the respective microfocusing lenses from opposite substrate surfaces. For example, upon detecting a surface elevation, the pulse duration can be reduced, the repetition rate reduced and/or the distance between a microfocusing lens and substrate surface increased.

Thus, the present invention provides an optical feedback detection system for adjusting the relevant parameters during laser texturing in response to detected surface variations. The relevant laser texturing parameters adjusted in response to detected surface variations in accordance with certain embodiments of the present invention include of the distance between one or both microfocusing lenses and the substrate surfaces undergoing laser texturing, laser power, pulse duration and/or repetition rate of a pulsed laser beam. The present invention, therefore, enables uniform laser texturing of substrate surfaces to achieve a flying height less than about 300 Å.

An embodiment of the present invention is schematically illustrated in FIG. 1 and comprises laser head 200, e.g., a $CO_2$ or YAG laser light beam source for delivering laser light beams to opposite surfaces 211 and 212 of substrate 210 mounted on spindle 220 rotated about axis 221 in the direction indicated by arrow A. Laser head 200 is linked to beam splitter 230 via electronic shuttle 230, automatic attenuator 240, optical coupling 250, fiber optic cable 260, optical coupling 251, and beam splitter 270. Fiber optic cables 261 and 262 are linked to beam splitter 270 via optical couplings 252. Fiber optic cable 261 is optically linked to microfocusing lens 292 via optical coupling 253, while fiber optic cable 262 is optically linked to microfocusing lens 291 via optical coupling 253. As substrate 210 rotates, sub-laser light beams 301 and 302 impinge upon surfaces 211 and 212, respectively, forming a uniform pattern of precisely formed protrusions. The fiber optic cables can be maintained in position employing conventional clamps 263, 264, 265, thereby considerably reducing the continuous maintenance required for precise alignment of mirrors and lenses as required in conventional laser delivery systems.

In addition, in accordance with the embodiment of the present invention depicted in FIG. 1, fiber optic probes 400 are positioned proximate opposite surfaces 211 and 212 of substrate 210 and linked by fiber optic cables 410 to an optical feedback data processing and control system comprising processor 420, peripheral terminal 430 linked to processor 420 at 421 and a laser control 440 with linkage 430. Laser controller 440 is linked to laser head 201 via coupling 441. Laser head 200 includes linkage 450 to automatic attenuator 240 for adjusting the laser power in response to a surface variation detected by fiber optic probes 400. The optical feedback data processing and control system receives light signals from fiber optic probes 400 indicative of a detected surface variation, converts the light signals to electrical signals and, via controller 400, adjusts a laser light beam parameter, such as power, in response to the detected surface variations.

The embodiment depicted in FIG. 3 is similar to the embodiment depicted in FIG. 1, wherein similar elements bear similar reference numerals. However, the embodiment depicted in FIG. 3 includes displacement mechanism controller 300 as part of the optical feedback data processing and control system. Displacement mechanism controller is linked by lines 310 and 320 to microfocusing lenses 292 and 291, respectively, for adjustment of the distance between the microfocusing lenses on opposite sides of substrate 210 in response to surface variations detected by fiber optical probes 400.

The embodiments of the present invention involve the use of conventional components which are commercially available. For example, the fiber optical probes employed in the present invention can be obtained from MTI located in Lanthanm, NY. In another embodiment of the present invention, the fiber optic probes are modified, as shown in FIG. 2, by providing a plurality of light transmitting fibers 50 and a plurality of light receiving fibers 51. See, for example, Kissinger et al., "Fiber-Optic Probe Measures Runout of Stacked Disks", July-August 1997 Data Storage, pages 79–84. The use of control systems for responding to detected surface variations has previously been employed. See, for example, Muranushi et al., U.S. Pat. No. 5,153,785, the entire disclosure of which is incorporated herein by reference.

In practicing the present invention, the substrate can be any substrate typically employed in the manufacture of magnetic recording media, such as a metal substrate or an alternate substrate comprising a glass, ceramic or glass-ceramic material or such as O'Hara, Hoya and Nippon glass. Other conventional substrates include aluminum alloy substrates with a coating thereon, such as nickel-phosphorous. It has been found suitable to employ a $CO_2$ laser when texturing a glass, ceramic or glass-ceramic substrate, and YLF, $YVO_4$, and YAG lasers when texturing a NiP or metal substrate.

As one having ordinary skill in the art would recognize, conventional practices in manufacturing a magnetic recording medium comprise texturing opposite surfaces of a substrate and depositing a plurality of layers thereon. As one having ordinary skill in the art would also recognize, after laser texturing opposite substrate surfaces in accordance with the present invention, conventional layers are deposited thereon to complete the magnetic recording medium. For example, various conventional magnetic recording media comprise sequentially sputter deposited layers on the substrate, such as an underlayer, magnetic alloy layer and protective overcoat. A lubricant topcoat is also conventionally applied to the protective topcoat.

The magnetic layers deposited in accordance with the present invention can be any of those conventionally employed in the production of magnetic recording media. Such conventional magnetic alloys, include, but are not limited to, cobalt (Co) alloys, such as Co-base alloys, e.g., cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise chromium or a chromium-alloy, such as chromium-vanadium or chromium-titanium, oxygen-doped chromium, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

The present invention can be employed to produce any of various types of magnetic recording media, including thin film disks, with an attendant improvement in flying stability, glide performance and head-medium interface reliability. The present invention advantageously eliminates the formidable requirements of conventional laser delivery systems for maintaining precise alignment of a complex system of mirrors and lenses in laser texturing a substrate to achieve a flying height of less than about 300 Å, and provides means for detecting surface variations and an optical feedback data processing and control system for adjustment of a relevant texturing parameter system in response to detected surface variations to maintain precision during laser texturing.

Only the preferred embodiment of the invention and but a few examples of its versatility are shown and described in the present invention. It is to be understood that the invention is capable of use in various other combinations and environments and is capable of changes or modifications within the scope of the inventive concept as expressed herein.

What is claimed is:

1. An apparatus for laser texturing a substrate for a magnetic recording medium, which apparatus comprises:

a source for emitting a laser light beam;

a substrate comprising first and second untextured surfaces;

a spindle for rotating the substrate during laser texturing;

a first microfocusing lens positioned proximate the first surface of the substrate through which a first laser light sub-beam is impinged on the first surface;

a first fiber optic cable having a first end optically linked to the laser light beam source and a second end optically linked to the first microfocusing lens; and a first optical probe positioned proximate the first surface to detect a variation in the planarity of the untextured first surface.

2. The apparatus according to claim 1, further comprising:

a second microfocusing lens positioned proximate the second surface of the substrate, opposite the first surface, through which a second laser light sub-beam is impinged on the second surface;

a second fiber optic cable having a first end optically linked to the laser light beam source and a second end optically linked to the second microfocusing lens; and a second optical probe positioned proximate the second surface to detect a variation in the planarity of the untextured second surface.

3. The apparatus according to claim 2, wherein the first microfocusing lens and the second microfocusing lens have substantially the same depth of focus.

4. The apparatus according to claim 3, further comprising:

a third fiber optic cable having a first end optically linked to the laser light beam source and a second end optically linked to a beam splitter; wherein, the first end of the first and second fiber optic cables are optically linked to the beam splitter.

5. The apparatus according to claim 4, wherein the first end of the third fiber optic cable is optically linked to the laser light source sequentially through an automatic attenuator and an electric shuttle.

6. The apparatus according to claim 2, wherein the variation comprises surface runout.

7. The apparatus according to claim 2, wherein each microfocusing lens is positioned at the same distance from the surface of the substrate.

8. The apparatus according to claim 7, further comprising a data processing and control system linked to the optical probes for receiving a light signal from the optical probes, generating a voltage signal and adjusting a texturing parameter in response to a detected surface variation.

9. The apparatus according to claim 8, wherein the data processing and laser control system comprises:

an optical feed-back data processor linked to the first and second optical probes; and a controller for adjusting a laser parameter.

10. The apparatus according to claim 9, wherein the data processing and laser control system further comprises a controller for adjusting the distance between a microfocusing lens and a surface of the substrate.

11. The apparatus according to claim 8, wherein the data processing and laser control system adjusts at least one of the laser power, pulse duration and repetition rate in response to a detected variation.

12. The apparatus according to claim 2, wherein each optical probe is a fiber optic probe.

13. The apparatus according to claim 12, wherein each fiber optic probe comprises a plurality of light transmitting fibers and a plurality of light receiving fibers.

14. A method of manufacturing a magnetic recording medium, which method comprises:

passing a first laser light sub-beam through a first fiber optic cable and then through a first microfocusing lens to impinge on a first surface of a rotating substrate to texture the first surface of the substrate; and detecting a variation in the planarity of the untextured first surface during texturing.

15. The method according to claim 14, further comprising:

passing a second sub-laser light beam through a second fiber optic cable and then through a second microfocusing lens to impinge on a second surface of the rotating substrate opposite the first surface to texture the second surface of the substrate; and detecting a variation in the planarity of the second untextured surface during texturing.

16. The method according to claim 15, further comprising:

passing a laser light beam through a third fiber optic cable to a fiber optic beam splitter; and splitting the laser light beam into the first and second sub-laser light beams.

17. The method according to claim 16, comprising:

passing the laser light beam from the laser light beam source sequentially through an electrical shuttle and an automatic attenuator to the third fiber optic cable.

18. The method according to claim 16, comprising controlling the laser light beam in response to a detected surface variation.

19. The method according to claim 18 comprising adjusting at least one of the laser power, laser pulse duration, laser repetition rate and distance between a microfocussing lens and a substrate surface in response to a detected surface variation.

20. The method according to claim 15, comprising detecting the surface variation with an optical probe.

21. The method according to claim 20, wherein the optical probe comprises a fiber optic probe.

22. The method according to claim 21, wherein the fiber optic probe comprises a plurality of light transmitting fibers and a plurality of light receiving fibers.

23. The method according to claim 15, wherein the first microfocusing lens and the second microfocusing lens have substantially the same depth of focus and are positioned at substantially the same distance from the substrate surface.

24. the method according to claim 15, wherein the detected surface variation comprises surface runout.

25. The method according to claim 15, comprising texturing the substrate to form a landing zone comprising a plurality of substantially uniform protrusions having a height of about 100 Å to about 200 Å, a diameter of about 5,000 Å to about 6,000 Å and a spacing of about 20,000 Å to about 50,000 Å.

26. The method according to claim 15, further comprising:

depositing an underlayer on the laser textured surface; and depositing a magnetic layer on the underlayer.

27. The method according to claim 26, further comprising:

depositing a protective overcoat on the magnetic layer; and depositing a lubricant topcoat on the protective overcoat.

28. An apparatus for laser texturing a substrate for a magnetic recording medium, which apparatus comprises:

a source for emitting a laser light beam;

a spindle for rotating the substrate during laser texturing;

a first microfocusing lens positioned proximate a first surface of the substrate through which a first laser light sub-beam is impinged on the first surface;

a first fiber optic cable having a first end optically linked to the laser light beam source and a second end optically linked to the first microfocusing lens;

a first optical probe positioned proximate the first surface for detecting a variation in the planarity of the first surface;

a second microfocusing lens positioned proximate a second surface of the substrate, opposite the first surface, through which a second laser light sub-beam is impinged on the second surface;

a second fiber optic cable having a first end optically linked to the laser light beam source and a second end optically linked to the second microfocusing lens;

a second optical probe positioned proximate the second surface for detecting a variation in the planarity of the second surface;

a third fiber optic cable having a first end optically linked to the laser light beam source; and a second end optically linked to a beam splitter; wherein, the first end of the first and second fiber optic cables are optically linked to the beam splitter, wherein:

the first end of the first and second fiber optic cables are optically linked to the beam splitter;

the first microfocusing lens and the second microfocusing lens have substantially the same depth of focus; and the first end of the third fiber optic cable is optically linked to the laser light source sequentially through an automatic attenuator and an electric shuttle.

29. A method of manufacturing a magnetic recording medium, which method comprises:

passing a first laser light sub-beam through a first fiber optic cable and then through a first microfocusing lens to impinge on a first surface of a rotating substrate to texture the first surface of the substrate;

detecting a variation in the planarity of the first surface during texturing;

passing a second sub-laser light beam through a second fiber optic cable and then through a second microfocusing lens to impinge on a second surface of the rotating substrate opposite the first surface to texture the second surface of the substrate;

detecting a variation in the planarity of the second surface during texturing;

passing the laser light beam from the laser light beam source sequentially through an electrical shuttle and an automatic attenuator to a third fiber optic cable and the third fiber optic cable to a fiber optic beam splitter; and splitting the laser light beam into the first and second sub-laser light beam.

30. An apparatus comprising:

a substrate comprising first and second untextured surfaces;

a spindle for rotating the non-magnetic substrate; and means for laser texturing the untextured surfaces of the non-magnetic substrate in response to detecting a variation in the planarity of the untextured surfaces.

* * * * *